UNITED STATES PATENT OFFICE.

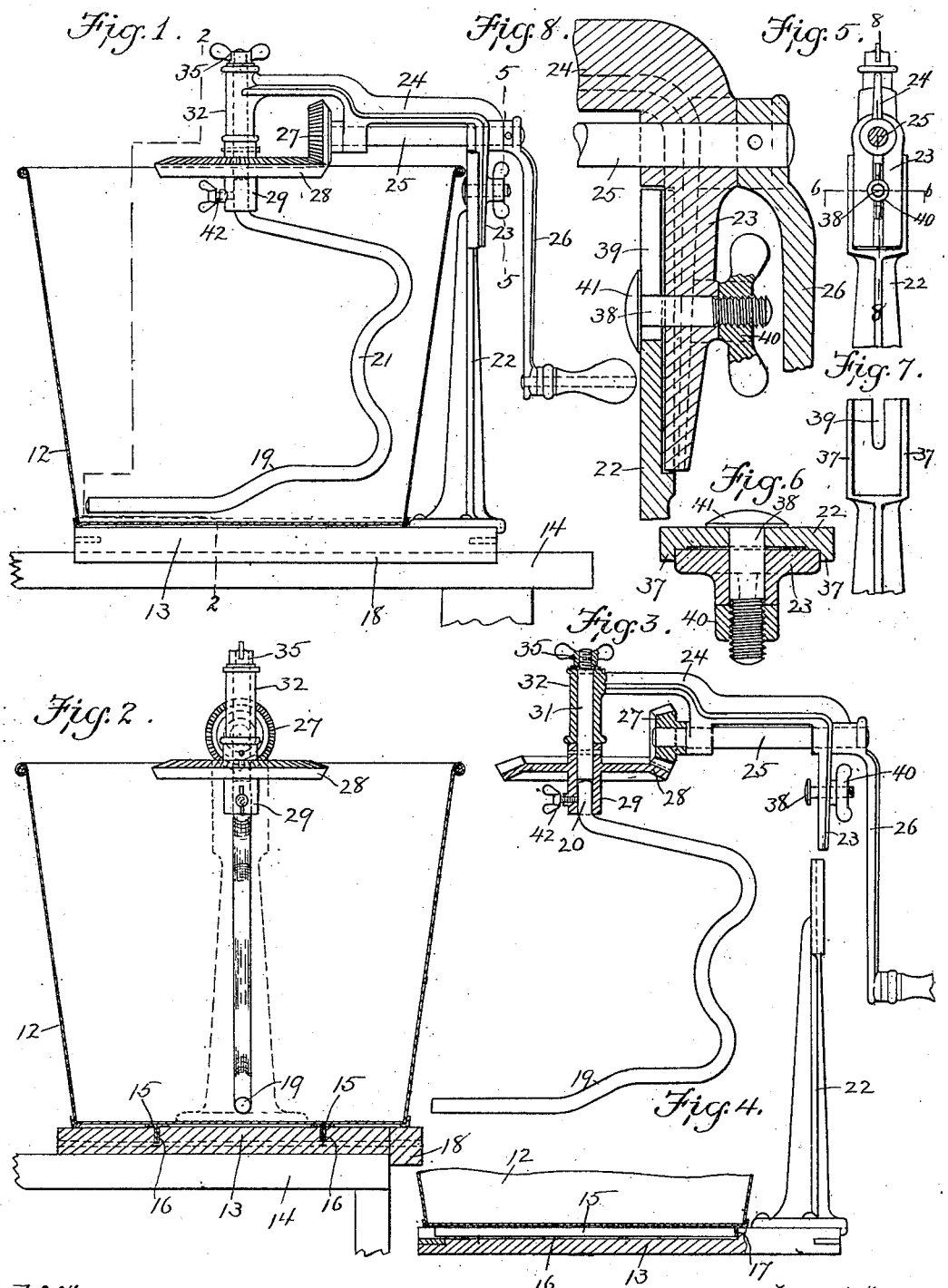

EDGAR SHAW, OF SWAMPSCOTT, MASSACHUSETTS.

APPARATUS FOR MIXING DOUGH, &c.

No. 838,467.   Specification of Letters Patent.   Patented Dec. 11, 1906.

Application filed September 21, 1906. Serial No. 335,587.

*To all whom it may concern:*

Be it known that I, EDGAR SHAW, of Swampscott, in the county of Essex and State of Massachusetts, have invented certain new and useful Improvements in Apparatus for Mixing Dough, &c., of which the following is a specification.

This invention relates to mixing or stirring apparatus comprising a base adapted to rest upon a table or other support, a receptacle for the materials to be mixed adapted to be detachably mounted on the base, and mixing or stirring mechanism supported by the base and adapted to operate on materials contained in the receptacle. In an apparatus of this character for mixing or kneading dough considerable force has to be exercised by the operator in moving the stirring device, especially after the dough attains a considerable degree of stiffness.

One object of my invention is to enable the operator to readily control the mixing apparatus and prevent its displacement on the table by the force applied to move the stirring device without the employment of clamping devices positively engaging the table, my improved apparatus being adapted to be placed on and removed from the table without the delay incidental to the adjustment of clamping devices and adapted to be firmly held in position on the table by pressure exerted by the operator.

Another object of the invention is to provide certain improvements relating to the mixing or stirring mechanism, whereby the stirring device may be vertically adjusted in the receptacle and whereby other desirable results may be attained.

The invention consists in the improvements which I will now proceed to describe and claim.

Of the accompanying drawings, Figure 1 represents a side elevation of a mixing apparatus embodying my invention, the receptacle being shown in section. Fig. 2 represents a section on line 2 2 of Fig. 1 looking toward the right. Fig. 3 represents the mixing or stirring device and a part of the mechanism which supports the same, certain parts being shown in section. Fig. 4 represents a partial side elevation and partial sectional view showing the base, a portion of the receptacle, and a portion of the support for the rotary mixer. Fig. 5 represents a section on line 5 5 of Fig. 1 looking toward the left. Fig. 6 represents a section on line 6 6 of Fig. 5. Fig. 7 represents a fragmentary view of a part of the supporting-standard affixed to the base. Fig. 8 represents a section on line 8 8 of Fig. 5.

The same reference characters indicate the same parts in all the figures.

In the drawings, 12 represents a receptacle, preferably composed mainly of sheet metal and open at its upper end, the receptacle being preferably of tapering form.

13 represents a base which is formed to support the receptacle 12 and is adapted to rest loosely on a table 14 or other like support.

To provide for the convenient holding of the base and receptacle in their operative positions relatively to each other, I provide the bottom of the receptacle and the base with complemental coupling members which are adapted to be detachably engaged or interlocked by the operation of applying the receptacle to the base. The said members as here shown comprise projecting ribs 15 on the bottom of the receptacle and slots or grooves 16 in the top of the base, said slots being formed to receive the ribs. The slots 16 are preferably closed at their inner ends by shoulders 17, as shown in Fig. 4, said shoulders abutting against the ends of the ribs 15 and limiting the movement of the ribs in the slots in one direction. It is obvious that the opposite ends of the slots 16 may be similarly closed or obstructed, if desired. If the slots are closed at both ends, the receptacle will require to be applied and removed by a vertical movement, whereas if the slots are open at one end the receptacle may be applied to the base by a horizontal movement, causing the ribs to slide horizontally into the grooves. It will be seen that the ribs and grooves constitute an effective provision for quickly interlocking the receptacle with the base and permitting its ready removal therefrom. It is obvious that any other suitable form of interlocking members may be provided on the receptacle and base for the same purpose.

To facilitate the retention of the base in a given position on the table and prevent it from sliding loosely without the employment of clamping devices, I provide the base with a member 18, adapted to engage the table. The said member, as here shown, is a flange projecting downwardly from one edge of the base below the bottom thereof and adapted to bear against one edge of the table, as shown in Fig. 2. The flange 18 is preferably located at the front edge of the base, so that it bears against the front edge of the table, and may be pressed against the latter by the operator, who is thus enabled to conveniently hold the base and the receptacle thereon in a given position on the table.

19 represents a rotary stirring device which is adapted to be revolved in the receptacle and stir or mix the contents thereof. Said device is preferably a stout metal rod bent into substantially the form shown in Figs. 1 and 3, although the form may be varied and other forms used. As here shown, the mixing device has a shank 20 at its upper end. Below the shank 20 the mixing device is bent laterally and provided with a curved portion 21, which is adjacent to the side of the receptacle 12. The lower portion of the mixer extends in a substantially horizontal direction or substantially parallel with the bottom of the receptacle.

22 represents a standard affixed to the base 13 and having its upper end portion formed to engage a shank 23, formed on an arm 24, which overhangs the receptacle and is provided with bearings in which is journaled a shaft 25. To said shaft are affixed a crank 13, adapted to be turned by the operator, and a bevel-gear 27, meshing with a bevel-gear 28 and having a socket 29, which receives the shank 20 of the mixing device. The gear 28 and its socket 29 are affixed to a vertical stud or shaft 31, which is journaled in a sleeve 32, formed on the arm 24. A set-screw 35, engaged with the upper end of the shaft 31 and resting on the upper end of the sleeve 32, supports the shaft and the gear 28. The standard 22 and the shank 23 constitute collectively an extensible or vertically-adjustable standard, means being provided for securing the shank 23 to the standard 22 at different heights. As here shown, the standard 22 is provided with vertical ears or ribs 37, which bear against the edges of the shank 23, as shown in Fig. 6. A bolt 38, passing through a vertical slot 39 in the standard 22 and through an orifice formed for its reception in the shank 23, connects the said parts, the said bolt being provided with a thumb-nut 40, bearing upon the shank 23, and with a head 41, bearing on the standard 22. When the thumb-nut is tightened, the standard and shank are securely locked together. The slot 39 permits the shank 23 to be raised to vary the height of the mixing device 19 in the receptacle 12. This vertical adjustability of the mixing device I find very desirable in a dough-mixer, as it enables the bent portion 21 to be maintained at the desired height with reference to the top of the mass of dough. By removing the bolt 38 the arm 24 and the mixing device 19 may be released and removed from the apparatus, leaving the receptacle unobstructed.

The mixing device 19 is detachably secured to the socket 29 by a thumb-screw 42, so that differently-formed mixing devices may be used interchangeably with said socket. For example, a mixing device formed suitably for churning may be substituted for the device here shown.

It will be seen that my improved mixing apparatus is adapted to be placed on any desired part of a table adjacent to the edge thereof and held firmly against horizontal movement on the table in any direction by pressure applied by the operator in any convenient way in such manner as to hold the member 18 against the edge of the table. I am therefore enabled to avoid the expense, complication, and bulk which would be involved by the employment of clamping devices to positively secure the apparatus to the table. Moreover, the apparatus may be applied to various parts of the top of the table—that is, at a variety of points between the ends of the table edge engaged by the member 18. By dispensing with clamping devices I not only save expense, complication, and undesirable bulk, but also enable the apparatus to be quickly installed and removed.

I claim—

1. A mixing apparatus comprising a base adapted to rest loosely on a table and having a downwardly-projecting member adapted to engage the edge of the table, a receptacle adapted to rest on the base, an arm overhanging the receptacle, means for detachably securing the arm to the base, a vertical shaft journaled in the arm, a mixer secured to the shaft, and means carried by the arm for rotating the shaft and mixer.

2. A mixing apparatus comprising a base adapted to rest loosely on a table, and having a table-engaging member projecting below its bottom, a receptacle adapted to rest on the base, said receptacle and base having interlocking coupling members, a standard affixed to the base beside the receptacle, an arm having a shank adjustably connected to the standard, a vertical shaft journaled in the arm, a mixer secured to said shaft, and means carried by the arm for rotating the shaft and mixer.

3. A mixing apparatus comprising a base, adapted to rest loosely on a table, and having a table-engaging member projecting below its bottom, a receptacle adapted to rest on the base, said receptacle and base having interlocking coupling members, an arm overhanging the receptacle, a standard affixed to the base, means for detachably securing the arm to the standard, a vertical shaft journaled in the arm and provided with a socket at its lower end, a mixer detachably secured to said socket, and means carried by the arm for rotating the shaft and mixer.

In testimony whereof I have affixed my signature in presence of two witnesses.

EDGAR SHAW.

Witnesses:
C. F. BROWN,
E. BATCHELDER.